United States Patent [19]

Collie

[11] Patent Number: 5,121,805

[45] Date of Patent: Jun. 16, 1992

[54] ROBOT DEVICES

[75] Inventor: Arthur A. Collie, Hampshire, England

[73] Assignees: Portsmouth Technology Consultants Limited; Portsmouth Polytechnic Enterprise Limited, both of Portsmouth, England

[21] Appl. No.: 493,847

[22] Filed: Mar. 15, 1990

[30] Foreign Application Priority Data

Mar. 21, 1989 [GB] United Kingdom ............... 8906541

[51] Int. Cl.$^5$ ............................................. B62D 57/02
[52] U.S. Cl. ..................................... 180/8.1; 180/8.6; 446/469
[58] Field of Search ............... 180/8.1, 8.2, 8.6; 446/434, 469, 356; 901/1; 414/730

[56] References Cited

U.S. PATENT DOCUMENTS

| 4,558,758 | 12/1985 | Littman et al. | 180/8.1 |
| 4,565,487 | 1/1986 | Kroczynski | 180/8.6 |
| 4,662,465 | 5/1987 | Stewart | 180/8.1 |
| 5,040,626 | 8/1991 | Paynter | 180/8.1 |

FOREIGN PATENT DOCUMENTS

| 0157633 | 10/1985 | European Pat. Off. | |
| 2647840 | 12/1990 | France | |
| 6092173 | 5/1985 | Japan | |
| 104474 | 6/1985 | Japan | 180/8.1 |
| 251284 | 11/1987 | Japan | 180/8.1 |
| 3580 | 1/1990 | Japan | 180/8.1 |
| 48283 | 2/1990 | Japan | 180/8.1 |
| 2161434 | 1/1986 | United Kingdom | 180/8.1 |
| 8302419 | 7/1983 | World Int. Prop. O. | |

Primary Examiner—Mitchell J. Hill
Attorney, Agent, or Firm—Shlesinger, Arkwright & Garvey

[57] ABSTRACT

A robot device, preferably in the form of a walking robot 1 comprises a chassis 3 and a plurality of articulated legs 7, each leg 7 comprising an upper leg 10 rotatively and pivotally mounted on the chassis 3 and extending generally upwards therefrom, a lower leg 11 pivotally coupled to the upper leg 10 and a gripper foot 9 mounted on the lower leg 11, the gripper foot 9 being generally lower than the chassis 3, control of the articulated leg 7 being derived from three double acting pneumatic actuating cylinders 17, 18 and 19 each connected between the chassis 3 and the leg 7, position sensors 24, 25 and 26 being provided for determining the position of the leg and differential pressure sensors 42 being provided for sensing the force applied to the leg, processor control means 30 being provided for each leg 7 for effecting movement of the leg 7 in dependence upon the output of the position sensors 24, 25 and 26 and the differential pressure sensor 42. Preferably, the process control means 30 of each leg will be controlled by a remotely positioned personal computer 32 which controls the walking movement of the walking robot 1.

17 Claims, 4 Drawing Sheets

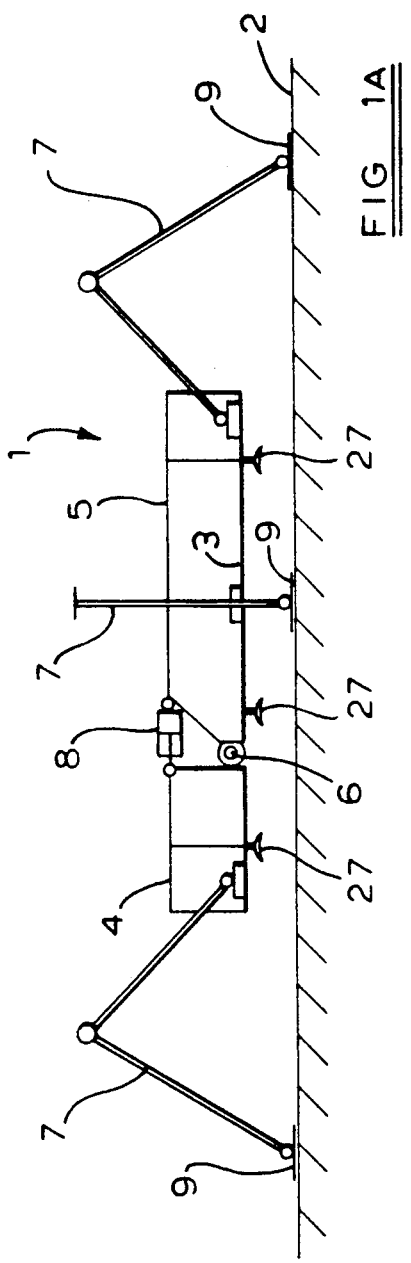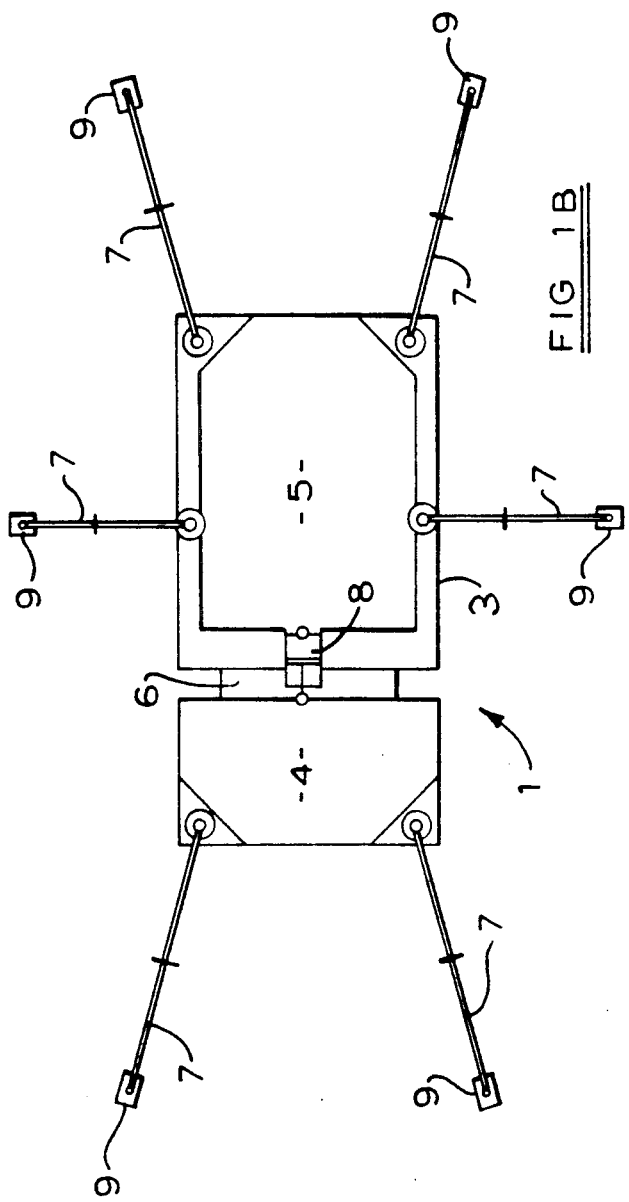
FIG. 1A
FIG. 1B

ROBOT DEVICES

This invention relates to robot devices and is especially applicable to walking robot devices.

BACKGROUND OF THE INVENTION

There are many occasions when large structures have to be inspected, cleaned or repaired This can be a dangerous and time consuming activity involving suspended work platforms or the erection of scaffolding. An alternative approach is to use a robot which can climb the structure carrying with it the tools and equipment to perform the required task. Such a robot must be light so that its weight does not strain the structure, yet rugged enough to work in an exterior environment and powerful enough to carry the necessary payload. A suitable robot has the potential for achieving considerable cost benefits compared with traditional methods.

SUMMARY OF THE INVENTION

It is an object of the present invention to provide an improved form of walking robot device which, in a preferred form, is relatively light and robust, is powerful enough to carry the necessary payload and which is adapted to climb over both horizontal and vertical smooth surfaces and to step over obstructions.

According to the present invention there is provided a robot device comprising a base such as a chassis, at least one articulated limb mounted on said base, said at least one limb comprising a first limb portion which is rotatively and pivotally mounted at one end on said base and which extends generally upwards from said base, and a second limb or leg portion one end of which is pivotally coupled to the other end of said first limb portion and which extends generally therefrom, first and second pneumatically controlled double acting actuating devices each rotatively and pivotally connected at each end between said first limb portion and said base, said first and second actuating devices each effecting both up-and-down movement and rotary movement of said first limb portion, a third pneumatically controlled double acting actuating device which is pivotally connected at each end between said first and second limb portions for extending and retracting said second limb portion, first and second position sensing means being provided associated with the rotary and pivotal mounting of said first limb portion for sensing the rotary position and up-and-down position respectively of said first limb portion, third position sensing means associated with the pivotal mounting between said first and second limb portions for sensing the extended and retracted position of said second limb portion, and differential pressure sensing means individually associated with each of said pneumatically controlled actuating devices for sensing the force applied to the associated limb portion, processor control means such as microprocessors being provided for effecting movement of said limb in dependence upon the outputs of said position sensing means and the outputs of said differential pressure sensing means.

In carrying out the invention it may be arranged that pneumatic valve means is provided associated with each of said actuating devices and operable under the control of said processor control means for effecting movement of said limb.

The pneumatic valve means preferably takes the form of a plurality of pulsed valves, typically three, three-way pulsed valves.

In a preferred arrangement according to the present invention, the robot device will take the form of a walking robot device, in which said base takes the form of a chassis, which may be articulated, said walking robot device comprising a plurality of said articulated limbs mounted on said chassis, each of said limbs constituting a leg of said device, each leg having processor control means individual thereto for effecting movement thereof.

In carrying out the preferred arrangement, computer means will be provided to which the processor control means of each leg is connected, for controlling walking movement of said walking robot device.

Preferably, said computer means is connected remotely to the processor control means of said device via a cable link.

Preferably, a source of pressurized air will be provided for said pneumatically controlled actuating devices of said legs, said source of pressurized air preferably being connected remotely to said robot device via a pneumatic pipe.

Advantageously, said cable link and said pneumatic pipe extend together to said robot device.

In one arrangement it may be arranged that each of the second limb portions extends generally downwards from said other end of said first limb portion, and the other end of each of said second limb portions extends below said chassis.

In an alternative arrangement it may be arranged that each leg is provided with a further limb portion, one end of which is pivotally mounted to the other end of the respective second limb portion, the other end of said further limb portion extending below said chassis.

Preferably, it will be arranged that the other end of each of said second limb portions or said further limb portions is provided with a foot portion, conveniently connected to the respective limb portion with a rotary and pivotal, e.g. ball-joint, mounting, each foot portion preferably being provided with attachment means, conveniently comprising one or more pneumatically controlled suction devices, for attaching the robot device to an adjacent surface or object.

Conveniently, the chassis of said robot device will be provided with one or more pneumatically controlled suction devices for attaching said chassis to said adjacent surface or object.

BRIEF DESCRIPTION OF THE DRAWINGS

FIGS. 1A and 1B show diagrammatic side and plan views respectively of a walking robot device in accordance with the present invention;

DESCRIPTION OF THE PREFERRED EMBODIMENTS

Figure 2A:
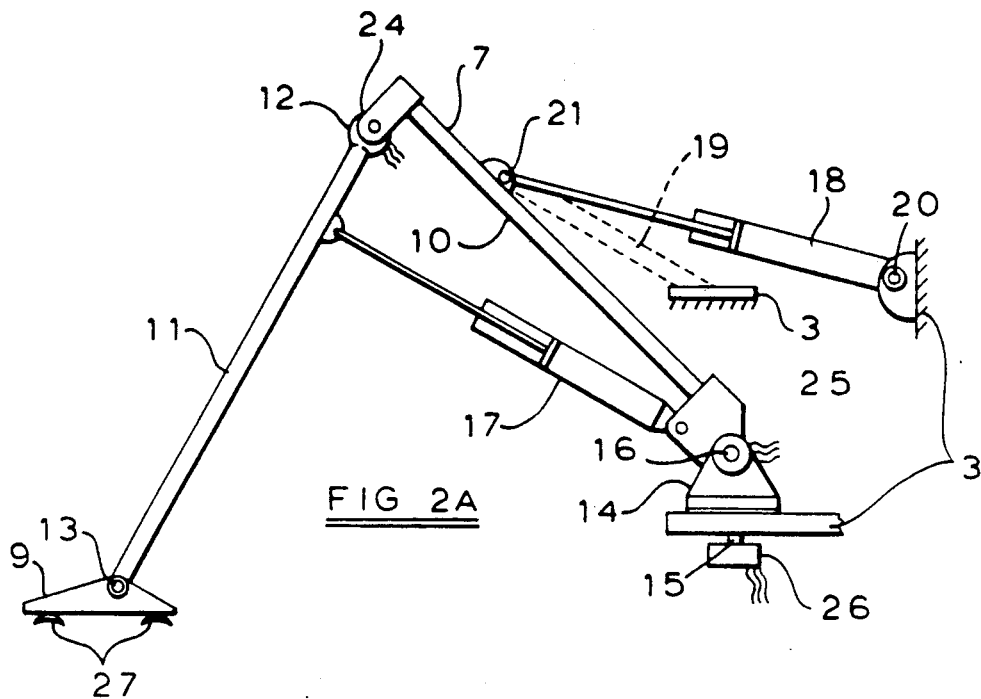
FIGS. 2A and 2B show side and plan views respectively of a typical leg arrangement for the device of FIGS. 1A and 1B.

FIGS. 1A, 1B, show the general arrangement of a multi-legged or multi-limbed walking robot 1 which is designed to grip on smooth surfaces, both horizontal and vertical, and climb over obstructions. For convenience, the walking robot 1 is described in relation to a supporting horizontal surface 2.

The walking robot 1 comprises an articulated base or chassis 3 in two parts 4 and 5, joined together by a hinge 6, and carries six articulated limbs constituted by legs or limbs 7. The front or thoracic region 4 carries two legs and the rear main body 5 carries the remaining four legs. A pneumatic cylinder 8 between the two parts 4 and 5 of the chassis 3 tilts the front part 4 at the hinge 6 so that the robot 1 can move easily over uneven terrain.

As will be described in greater detail hereinafter, each of the legs 7 of the robot 1 includes a foot 9 mounted at the end of the leg 7, the foot 9 preferably being provided with attachment means, such as one or more pneumatically controlled suction devices, for attaching the respective leg 7 to the surface 2. The underside of chassis 3 of the robot 1 may also be provided with similar attachment means 27 for attaching the chassis 3 to the surface 2, either during a walking operation or when a required task is being performed.

Each leg 7 of the robot 1 is fundamentally the same. However, because of their differing mounting positions and their fields of action, their joint construction and relative anchorage points to the chassis may vary for a front, mid, or hind leg.

Figure 2B:
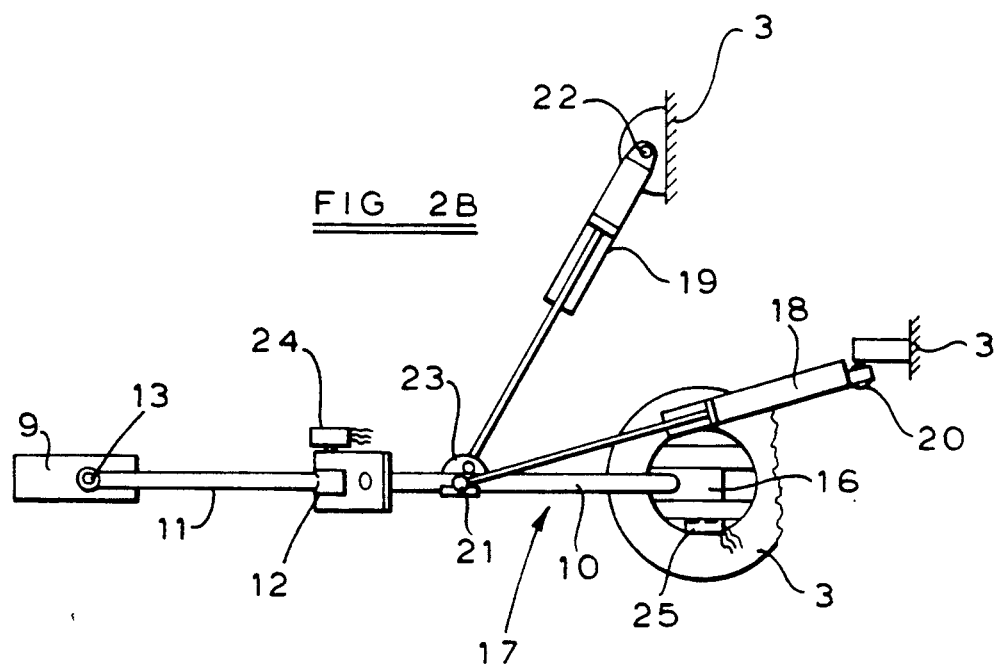

In FIGS. 2A and 2B of the drawings there is shown side and plan views respectively of the front, left-hand side leg 7 of the robot 1 of FIGS. 1A and 1B. The leg 7 shown consists of two parts, a first limb portion constituted by thigh or upper leg or upper limb 10 and a second limb portion constituted by lower leg or lower leg 11 pivotally joined at the knee 12 with one degree of freedom, allowing the two parts 10 and 11 of the leg 7 to hinge in the same plane A gripper foot 9 on a limited travel universal (ball) joint 13 is mounted at the extremity of the leg 7. The upper leg 10 is mounted on the chassis 3 at the hip 14 which consists of a swivel joint 15 and a pivot joint 16, and which allows the leg 7 to swivel, that is to rotate about an axis perpendicular to the plane of the chassis 3 and also to extend and retract The knee 12 is overhung so that the foot 9 at the end of the leg 7 is normally lower than the hip 14.

Movement of each part 10 and 11 of the leg 7 is accomplished by three double acting pneumatic actuating cylinders 17, 18 and 19. Cylinder 17 is pivotally connected between the upper leg 10 and lower leg 11 and extends or retracts the lower leg 11. Cylinder 18 is connected between the chassis 3 and the upper leg 10 by means of ball joints 20 and 21 and has the main effect of extending and retracting the upper leg 10. Cylinder 19, which can be referred to as the abductor, is connected between the chassis 3 and the upper leg 10 by means of ball joints 22 and 23 and has the main effect of rotating or swinging the leg 7 about the hip 14.

Position sensors in the form of potentiometers 24, 25 and 26 are connected to the joint at the knee 12 and to the joints 15 and 16 at the hip 14 so that the angles of the knee, hip and swing can be measured. A differential pressure sensor (not shown) is also provided in respect of each of the actuating cylinders 17, 18 and 19, so that forces on the leg 7 can be measured.

A feature of the mechanism is that the upper leg cylinder 18 and abductor cylinder 19 are mounted on the chassis 3 so that their fixings 20 and 22 and the hip 14 form an approximate equilateral triangle no edge of which need be common with the hip axes. This results in a very rigid linkage to the knee 12 and distributes the load on the chassis 3 thereby preventing high stress points which would otherwise occur. The absence of common axes requires that movement of the leg 7 involves control of both of the cylinders 18 and 19 simultaneously.

On the underside of the gripper foot 9 is provided, for example, two pneumatically controlled suction cups 27, for attaching the foot 9 to the surface 2 (FIGS. 1A and 1B).

The control of each leg 7 is effected by process control means such as individual dedicated microprocessors 30, a to f, (FIG. 3A), one for each of the legs 7 of the walking robot 1 of FIGS. 1A and 1B, connected on a common serial data link 31 to an IBM compatible personal computer 32 which defines the strategy and walking action of the robot 1 and transmits the leg commands. It is envisaged that the serial data link 31 may take the form of a fiber optic link and this may be embodied within the pneumatic tube (not shown) which is used to supply pressurized air to the robot 1, along with the required electrical power cables Each leg microprocessor 30, a to f, is a real time controller with power drivers 33 to electromatic valves (not shown) which control the pneumatic actuating cylinders 17, 18 and 19, via a valve drive bus 34, and an analog-to-digital interface 35 connected to an analog bus 36 for position and pressure sensing.

Figure 3A:
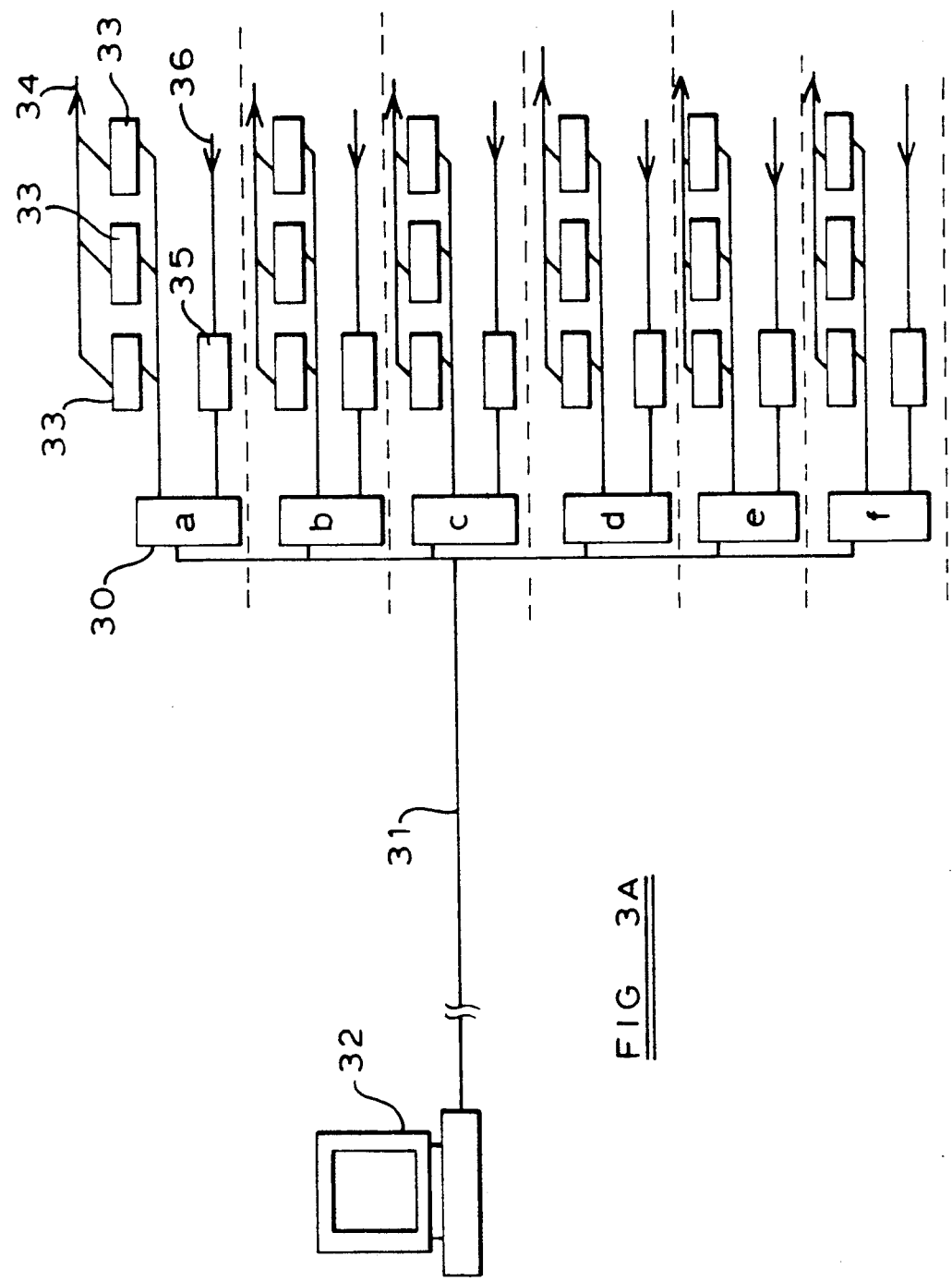
FIGS. 3A and 3B together form a block schematic diagram depicting the microprocessor control of the device of FIGS. 1A and 1B.
Figure 3B:
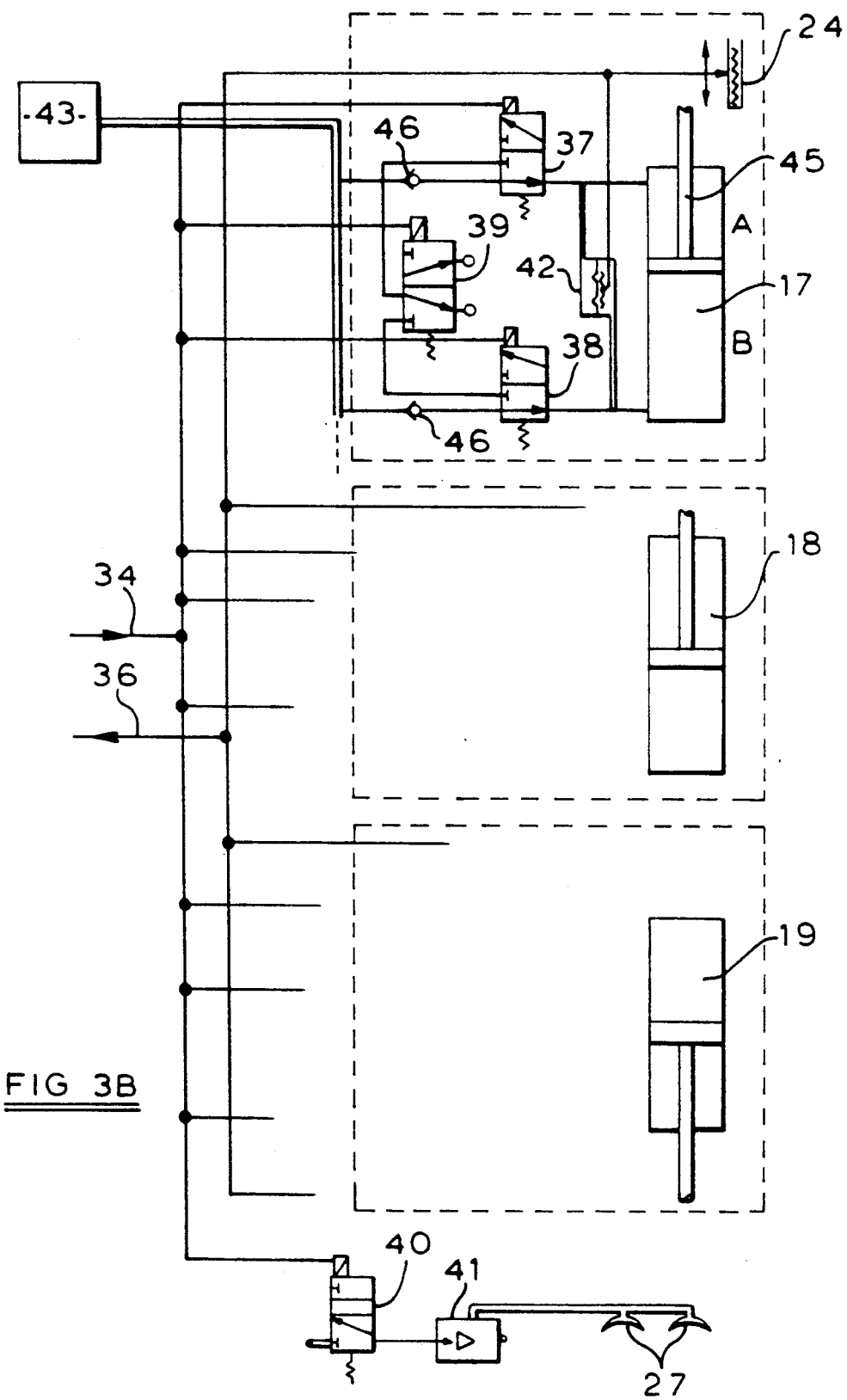

FIG. 3B depicts in block form the circuit for the double acting pneumatic actuating cylinders 17, 18 and 19 of each leg 7, and depicts the circuit relating to cylinder 17 in detail.

The valve drive bus 34 from the power drivers 33 (FIG. 3A) connects to three electromatic pneumatic valves 37, 38 and 39, associated with the pneumatic actuating cylinder 17 and to a gripper foot pneumatic circuit comprising an electromatic valve 40, vacuum ejector pump 41 and the suction cups 27. The analog bus 36 connects the output from a differential pressure sensor 42, which is connected across the actuating cylinder 17, and the outputs from the position sensors 24, 25, 26 (FIGS. 2A and 2B), only sensor 24 being shown, to the analog-to-digital interface 35 (FIG. 3A).

The pneumatic actuating cylinder 17 depicted in FIG. 3B operates in the following way. Under no-load conditions both the valves 37 and 38 allow air at full line pressure derived from a remote pressurized air source 43 via a pneumatic pipe 44 to enter both sides of the cylinder 17. If the difference in area on opposite sides of the piston 45 of the cylinder 17 is ignored then the piston 45 would remain stationary. Any attempt to force the piston 45 would result in an overpressure resisting the change because check valves 46 prevent air flow from the cylinder 17 to the pressurized air source 43. To compensate for load on the piston 45 and for the difference in area, pressure can be reduced on either side of the piston 45 by energizing the appropriate valve 37 or 38 so that the cylinder 17 vents to the valve 39. The valve 39 is connected as a diverter and can be pulsed to allow a quantity of air to be exhausted from either end of the cylinder 17. The differential pressure sensor 42 measures the effect.

Movement of a leg to complete a stride is made up of a series of movements of each part of the leg resulting from displacements of a mass of air from the appropriate pneumatic actuating cylinders 17, 18 and 19. The mass of air to be displaced is predictable from a knowledge of the present, past and "future" state conditions of volume, temperature and pressure within each cylinder. The volume is computed for the known limb geometry from the angles at the knee and hip joints measured by the position sensors 24, 25 and 26 (FIGS. 1A and 1B). The pressure data is derived from the differential pressure sensors 42 and forces acting on the leg which are similarly computed from the angle measurements. Temperature effects are taken into account by assuming isentropic expansion and by a correction algorithm which modifies the future state prediction by adjusting for previous errors.

The future states are derived from knowledge of the profile of a complete stride. As the leg moves the foot 9 must trace a path which may, in the simplest case, be composed of a power stroke where the foot 9 is on the ground, followed by a fly back stroke where the foot 9 is off the ground and forces are low. Further subdivisions of the profile are wait states where the foot 9 has to remain poised and the strike where the foot 9 detects resistance to movement and tests for firm footing before applying power.

The complete profile may be expressed as a series of aiming points to which the foot 9 is directed in sequence. Each of these aiming points is described by a set of parameters and a set of coordinates which define the spacial position of the foot 9 in three dimensions and the force to be exerted at the foot, and thus define a unique set of values for the three position sensors 24, 25 and 26, and the three differential pressure sensors 42. The set of parameters give normalized pressure data, the velocity ratio (piston displacement/angle relationship) and a value for a normalized time interval between successive points.

Normal walking does not require great precision and a total of, for example 4, aiming points may be sufficient for any one stride. Intermediate points can be found by interpolation if required so that true positional coordinates of the foot 9 can be found when needed for accurate position fixing, for example, when the robot 1 is used for carrying inspection equipment.

Calculation of the aiming point data would need an exact knowledge of the system geometry. However, it is a feature of the control system that these aiming points can be learned. The robot 1 is calibrated on a test matrix where fixed loads are applied to the foot 9 at known positions until an adequate coordinate and parameter map has been built up within each leg processor. This technique allows much simpler assembly and eliminates the need for precision engineering. It allows, for example, different lengths of legs to be used together.

The control algorithm computes the mass of air to be released from whichever side of the cylinder 17 corresponds to the intended direction of movement. That is, the piston 45 moves towards the low pressure side. (Under steady state conditions the high pressure side is continually replenished from the pressurized air source 43). The result of the computation is the time interval that the diverter valve 39 must exhaust the cylinder 17.

The algorithm for each leg 7 may be expressed in a simplified form as follows:
measure the current joint angles and cylinder pressures;
compare these with the last demanded aiming point;
calculate the angle errors and derive an angle correction factor;
calculate the load pressure correction factor;
look up next aiming point data and correct this by (current error) plus (memory factor) times (historic error), from the last pace;
store the total error to form the new historic error for the next pace;
using pressures and volumes of the new and current aiming points and the flow equations calculate the air velocity through the diverter valve and hence the pulse width to apply.

This algorithm demonstrates two fundamental features of the robot control. One, that the historic term allows the profile of a pace to be modified over a period determined by a memory factor which gradually reduces old errors but allows reinforced errors to accumulate. That is the robot learns. The other is that the control system is not required to be a closed loop between one aiming point and another. This avoids the inherent instability of control systems with compliant actuators such as pneumatic cylinders.

It is envisaged that the personal computer 32 (FIG. 3A) and the pressurized source of air 43 (FIG. 3B) may be positioned remotely from the walking robot 1 and connected to it by an umbilical cable which comprises the serial data link 31 (FIG. 3A) and the pneumatic pipe 44 (FIG. 3B). The power supply to the walking robot may also be remotely positioned, the necessary cable being included in the umbilical cable.

Alternatively, it is envisaged that the walking robot may contain its own power supply and pressurized source of air, and the serial data link 31 may be replaced by a suitable radio or other remote link.

It is also envisaged that each leg 7 could include a further leg portion either between the upper leg 10 and the lower leg 11 or between the lower leg 11 and the gripper foot 9, in order to extend the reach of the leg.

It should be appreciated that the walking robot that has been described has been given by way of example only and various modifications may be made dependent upon particular requirements. For example, other than six legs may be used; the chassis may or may not be articulated; position sensors other than potentiometers may be used; separate pressure sensors may be used in place of the differential pressure sensors 42; the gripper feet 9 may be dispensed with or may take some alternative form, e.g. flux switching, rare earth magnetic feet or mechanical gripper feet.

Although the articulated limb which has been described is designed for use as a leg in a walking robot, it should be appreciated that the articulated limb may have much wider application and may be used in robot devices generally where a manipulative robot arm is required.

I claim:

1. A robot device comprising a base, at least one articulated limb mounted on said base, said at least one limb comprising a first limb portion having amounting at one end whereby it is rotatively and pivotally mounted on said base and which extends generally upwards from said base and a second limb portion one end of which is pivotally coupled to the other end of said first limb portion and which extends generally therefrom, first and second pneumatically controlled double acting actuating devices each rotatively and pivotally connected at each end between said first limb portion and said base, said first actuating device effecting both up-and-down movement and rotary movement of said first limb portion, and said second actuating device effecting both up-and-down movement and rotary movement of said first limb portion a third pneumatically controlled double acting actuating device which is pivotally connected at each end between said first and second limb portions for extending and retracting said second limb portion, first and second position sensing means associated with the rotary and pivotal mounting of said first limb portion for sensing the rotary position and up-and-down position respectively of said first limb portion, third position sensing means associated with the pivotal mounting between said first and second limb portions for sensing the extended and retracted position of said second limb portion, and differential pressure sensing means individually associated with each of said pneumatically controlled actuating devices for sensing the force applied to the associated limb portion, and processor control means for effecting movement of said limb in dependence upon the outputs of said position sensing means and the outputs of said differential pressure sensing means.

2. A robot device as claimed in claim 1, comprising pneumatic valve means associated with each of said actuating devices and operable under the control of said processor control means for effecting movement of said limb.

3. A robot device as claimed in claim 2, in which the pneumatic valve means comprises a plurality of pulsed valves.

4. A robot device as claimed in claim 3, in which the pneumatic valve means comprises three, three-way pulsed valves.

5. A robot device as claimed in claim 1, constituting a walking robot device, in which said base comprises a chassis, said walking robot device comprising a plurality of said articulated limbs mounted on said chassis, each of said limbs constituting a leg of said device, each leg having processor control means individual thereto for effecting movement thereof.

6. A robot device as claimed in claim 5, comprising computer means to which the processor control means of each leg is connected, for controlling walking movement of said walking robot device.

7. A robot device as claimed in claim 6, in which said computer means is connected remotely to the processor control means of said device via a cable link.

8. A robot device as claimed in claim 5 comprising a source of pressurized air for said pneumatically controlled actuating devices of said legs.

9. A robot device as claimed in claim 8, in which said source of pressurized air is connected remotely to said robot device via a pneumatic pipe.

10. A robot device as claimed in claim 9 in which said cable link and said pneumatic pipe extend together to said robot device.

11. A robot device as claimed in claim 5, in which each of the second limb portions extends generally downwards from said other end of said first limb portion, and the other end of each of said second limb portions extends below said chassis.

12. A robot device as claimed in claim 11 in which the other end of each of said second limb portions is provided with a foot portion.

13. A robot device as claimed in claim 12, in which each foot portion is connected to its second limb portion with a rotary and pivotal mounting.

14. A robot device as claimed in claim 12 in which each foot portion is provided with attachment means for attaching the robot device to an adjacent surface or object.

15. A robot device as claimed in claim 14, in which the attachment means comprises one or more pneumatically controlled suction devices.

16. A robot device as claimed in claim 15 in which said chassis is provided with one or more pneumatically controlled suction devices for attaching said chassis to said adjacent surface or object.

17. A robot device as claimed in claim 5 in which said chassis is articulated.

* * * * *